US007286139B2

(12) United States Patent
Jiao

(10) Patent No.: US 7,286,139 B2
(45) Date of Patent: Oct. 23, 2007

(54) PARTIAL GUARDBAND CLIPPING

(75) Inventor: Yang (Jeff) Jiao, San Jose, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 581 days.

(21) Appl. No.: 10/943,488

(22) Filed: Sep. 17, 2004

(65) Prior Publication Data

US 2006/0061596 A1    Mar. 23, 2006

(51) Int. Cl.
*G09H 5/00* (2006.01)
(52) U.S. Cl. .................. 345/622; 345/420; 345/421; 345/428; 345/581; 345/628; 382/199; 382/202
(58) Field of Classification Search ............... 345/622, 345/628
See application file for complete search history.

(56) References Cited

U.S. PATENT DOCUMENTS

| | | | | |
|---|---|---|---|---|
| 4,888,712 A | * | 12/1989 | Barkans et al. ............. | 345/627 |
| 5,710,879 A | * | 1/1998 | Ashburn ..................... | 345/441 |
| 6,169,554 B1 | * | 1/2001 | Deering ...................... | 715/764 |
| 6,734,874 B2 | * | 5/2004 | Lindholm et al. .......... | 345/643 |
| 7,173,727 B2 | * | 2/2007 | Gupta et al. ................ | 358/1.15 |
| 2004/0130552 A1 | * | 7/2004 | Duluk et al. ................ | 345/506 |

* cited by examiner

*Primary Examiner*—Kee M. Tung
*Assistant Examiner*—Antonio A Caschera
(74) *Attorney, Agent, or Firm*—Thomas, Kayden, Horstemeyer & Risley

(57) ABSTRACT

A method for rendering a visible portion of an image that includes a plurality of graphics primitives. The size of the graphics primitives may be large and require the use of floating point numbers to represent the vertices. When the graphics primitives have a common vertex that is visible, the edge functions for the primitive are computed so as to avoid the common vertex becoming different for the different primitives. If the other vertices of the graphics primitives lie outside a bounding rectangle, then a vertex is formed at the intersection of the bounding rectangle and the graphics primitive. Fixed point numbers for the common vertex and other vertices including intersection vertices are then used to compute edge functions of the primitive and the primitive is rendered using the edge functions. If the common vertex is not visible, then floating point numbers are used to compute the edge functions.

7 Claims, 7 Drawing Sheets

PARTIAL GUARDBAND CLIPPING

CROSS-REFERENCE TO RELATED APPLICATIONS

1. Field of the Invention

This invention relates generally to computer- or game-related graphics systems and more particularly to the rendering of images, by means of graphics primitives, such as triangles, in the screen space of the computer or game system.

2. Description of the Related Art

It is desirable for a high speed graphics system to have a simple and fast way for computing pixels of a display buffer and their attributes. One such way is to design a processing engine that operates only on edges, each of which is represented by an edge function, $ax+by+c=0$. These edges define the boundaries of a graphics primitive, such as a triangle, whose interior is filled according to the attributes of the edges and orientation of the plane of the primitive. The processing engine is designed, preferably, to process many edge functions in parallel, thus creating high throughput for scenes that have a large number of graphics primitives. The following assumes that such edge function processing is available. However, before the edge processing engine can operate, the edge functions must be setup for the engine.

In setting up an edge function for the processing engine, one may use either fixed point or floating point calculations to compute the a, b, and c parameters of the edge. Floating point numbers are capable of representing a large range of numbers and are useful for representing vertices of graphics primitives, such as triangles, spanning a large distance. However, floating point calculations are error prone, because there is a limited, fixed-size fraction part in the floating point number. For example, floating point numbers, such as those according to the IEEE standard (IEEE 754), have the format of 1.8.23, where the 1 represents the sign bit, the 8 represents the number of bits for the exponent field, and 23 represents the number of bits for the fraction part. Because of the fixed-sized fraction part, floating point calculation results do not always have the same precision as the numbers used in the calculation. For example, if there are p bits of precision for two floating point numbers to be added, the sum may require p+1 bits of precision. A rounding rule is used, according to the standard, to return the sum to p bits of precision.

On the other hand, fixed point numbers are not subject to the same precision problems as floating point numbers, as long as the calculation results are within the bounds of the fixed point number system. Such numbers may have a format such as 15.5, where 15 gives the number of bits in the integer portion and 5 gives the number of bits after the radix. However, fixed point numbers cannot represent the vertices of primitives, such as triangles, that are outside of the maximum range of the fixed point numbers.

It often occurs that in a visible area 10 of the two-dimensional (2D) screen, that a vertex $V_0$ 12 is common to several graphics primitives (triangle 14, triangle 16), such as is shown in FIG. 1. If floating point numbers are used to setup the edge functions, $ax+by+c=0$, 18, 20, 22, 24 for the primitives, a problem occurs, due to the precision of floating point computations, for the common vertex. The problem is that the common vertex 12 of FIG. 1 may appear as multiple different vertices 30, 32, as shown in FIG. 2, leaving a "hole" or split vertex in the rendered image.

If only fixed point numbers are used in the computation of the edge functions, then all of the places 19, 21, 23, 25 where the edge functions intersect a bounding box 8, which represents the maximum range of the fixed point numbers, must be determined. These intersections are then used to set up the edge functions using fixed point numbers within the range for the parameters a, b, and c. Though this method may not suffer from the inaccuracies of floating point calculations, it is expensive in terms of graphics hardware. Many intersections may need to be computed if there are a large number of large graphics primitives having spans larger than the bounding box. Thus, there is a need for a more efficient way to calculate the edge functions, a way that can handle the large spans of the graphics primitives, yet avoid leaving a hole in the rendered 2D image.

BRIEF SUMMARY OF THE INVENTION

The present invention is directed towards this need. For edge functions of lines that have only edges (and not vertices) within the visible region of the screen, floating point calculations are used to set up the edge functions, because there is no vertex to be affected by a floating point precision problem. For edge functions of lines that have both vertices within the boundaries of the fixed point number system, fixed point calculations are used to set up the edge functions. Only if the line has an edge with one of the vertices outside of the bounding box and one of the vertices within the visible area, is the intersection determined. Then, the intersection is mapped to the grid and a fixed point calculation is used to set up the edge function. This guarantees that any shared vertices are not converted to multiple vertices, which would leave a hole in the visible image.

One embodiment of the present invention includes a method of rendering a visible portion of an image containing a plurality of graphics primitives having a visible common vertex, wherein each primitive has at least two other vertices and edge functions representing lines interconnecting the vertices of each primitive. The method includes forming edge functions for the lines interconnecting the vertices of each primitive using fixed point numbers, where the fixed point numbers are either within or on a bounding rectangle that defines the bounds of the fixed point numbers and rendering the graphics primitives based on the formed edge functions.

Another embodiment of the present invention includes a method of rendering a visible portion of an image containing a plurality of graphics primitives having a common vertex, wherein each primitive has at least two other vertices and edge functions representing lines interconnecting the vertices of the primitive. The method includes determining whether or not the common vertex is within the visible portion of the image. If the common vertex is visible, the method includes determining whether one or more of the other vertices of the plurality of graphics primitives are inside of or outside of a bounding rectangle that encloses the visible portion of the image. If the common vertex is visible and one or more of the other vertices are determined to be outside of the bounding rectangle, the method includes computing intersection vertices with the bounding rectangle of those primitives having other vertices outside of the bounding rectangle, mapping the other vertices including the intersection vertices and the common vertex to a grid setup in the bounding rectangle, representing the common vertex and the other vertices including the intersection vertices with fixed point numbers, and using the fixed point numbers of the common vertex and the other vertices including the intersection vertices to form edge functions of the graphics primitives. If the common vertex is visible and all of the other vertices of the graphics primitives are determined to be within the bounding rectangle, the method includes mapping the common vertex and other vertices to a grid setup in the bounding rectangle, and using fixed point numbers of the vertices to form edge functions of the graphics primitives. If the common vertex is not visible, the method includes using floating point numbers to form edge functions of the primitives. Finally, the graphics primitives are rendered based on the formed edged functions.

One advantage of the present invention is that intersection vertices need not be computed unless there is a visible common vertex and at least one of the graphics primitives with the common vertex has another vertex outside of the bounding rectangle. This greatly reduces the amount of computation needed to avoid "splitting" a common vertex.

BRIEF DESCRIPTION OF THE DRAWINGS

These and other features, aspects and advantages of the present invention will become better understood with regard to the following description, appended claims, and accompanying drawings where:

DETAILED DESCRIPTION OF THE INVENTION

There are several cases to consider.

Figure 1:
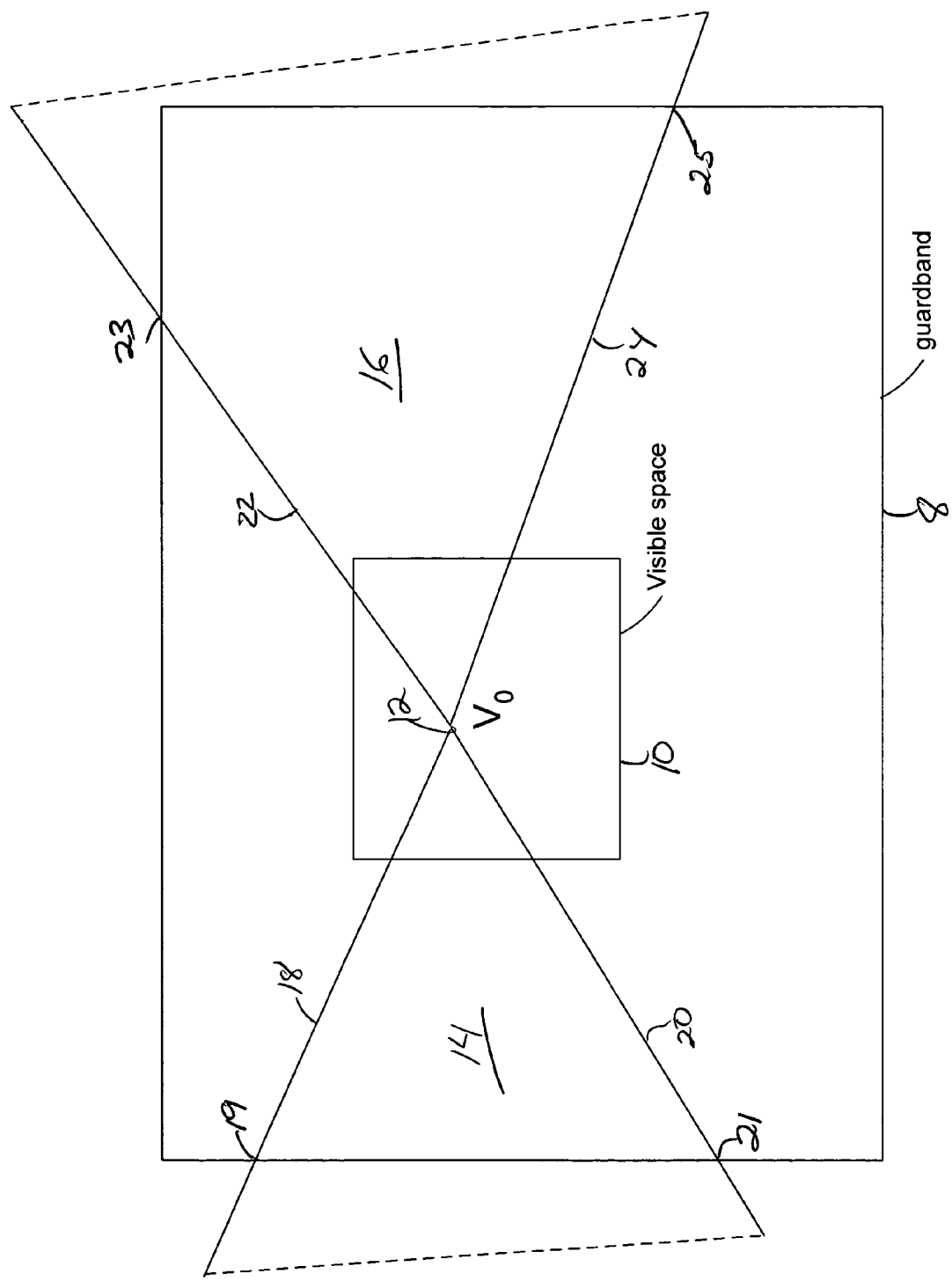
FIG. 1 shows a typical case of a pair of graphics primitives having a common vertex that lies in a visible space.
Figure 2:
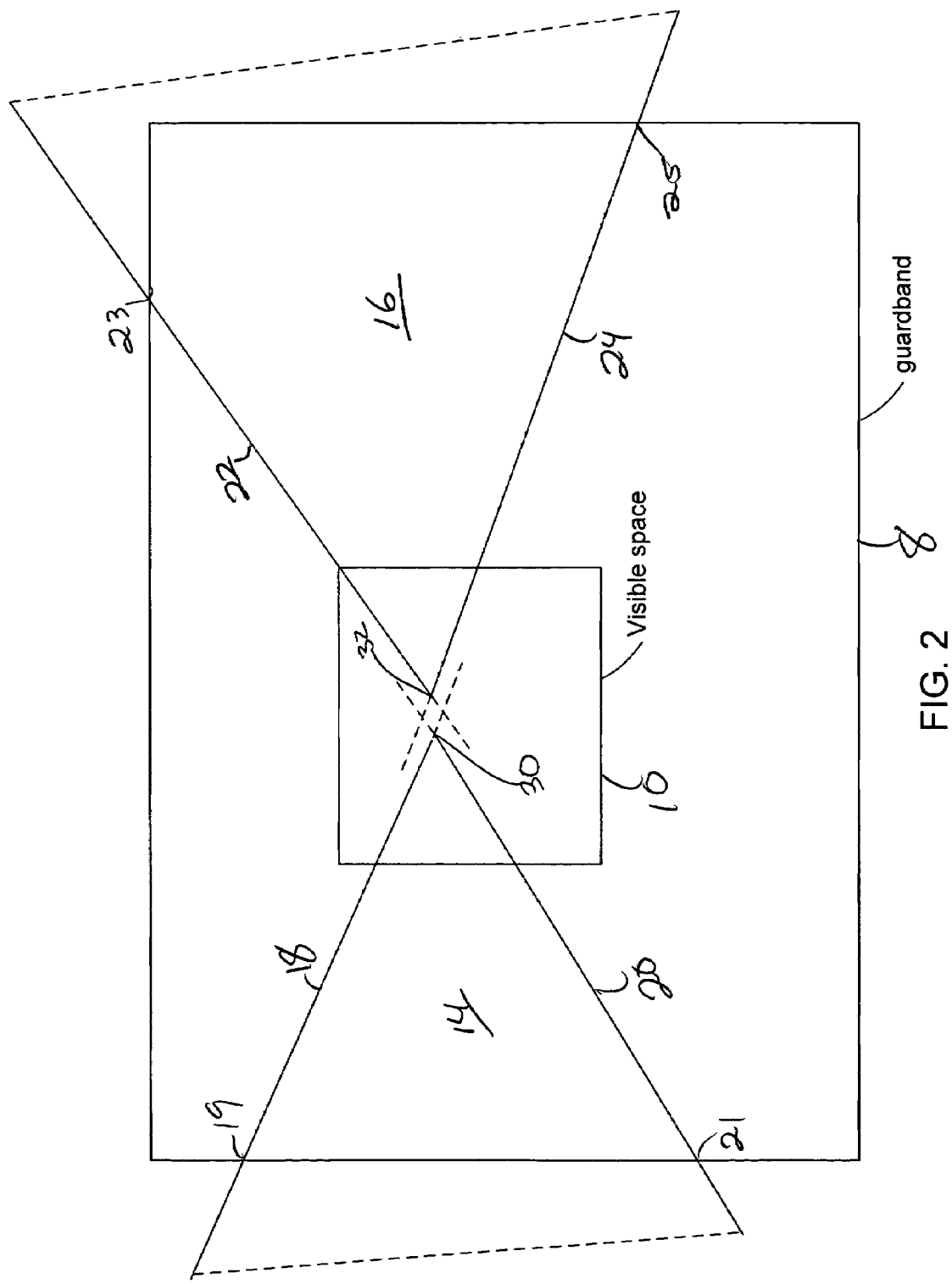
FIG. 2 shows the problem in the current art computing edge functions using floating point calculations when a shared vertex is visible.
Figure 3:
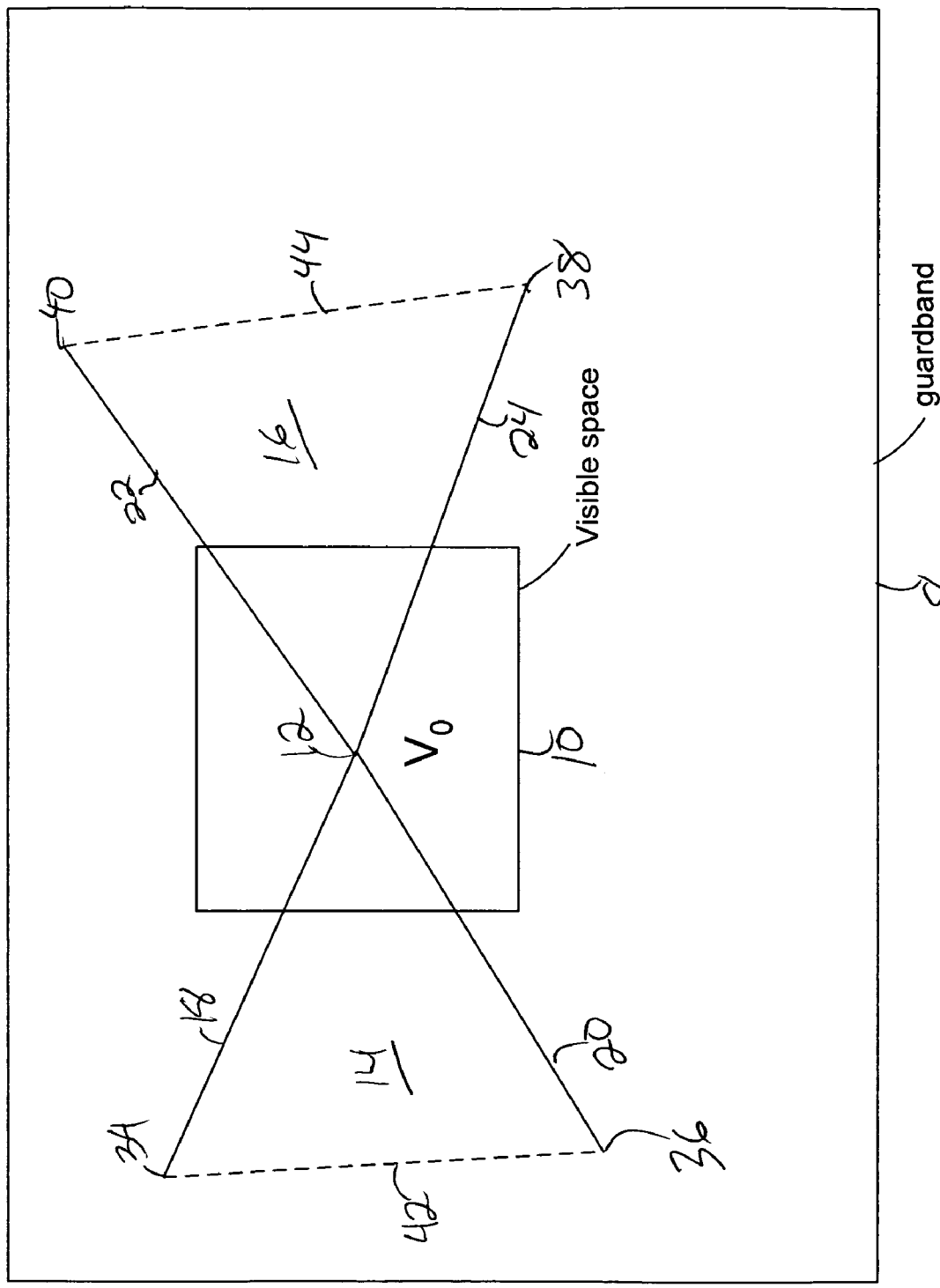
FIG. 3 shows the case where the common vertex is visible and the size of the graphics primitives is such as to be within the (guard band) bounding rectangle.

In the first case, shown in FIG. 3, the common vertex $V_0$ 12 is within the visible portion of the image being rendered and the other vertices 34, 36, 38, 40 of the graphics primitives 14, 16 are within the bounding rectangle 8 but outside of the visible area 10. In this case, fixed point numbers are assigned to the vertices 12, 34, 36, 38, 40 and the vertices are then mapped to a grid setup within the bounding rectangle 8. The particular fixed point numbers resulting from the mapping of the vertices are then used set up the edge functions, $ax+by+c=0$, 18, 20, 22, 24, 42, 44 that define the boundaries of each of the primitives 14, 16, and the primitives 14, 16 are rendered by means of the edge functions 18, 20, 22, 24, 42, 44.

Figure 4:
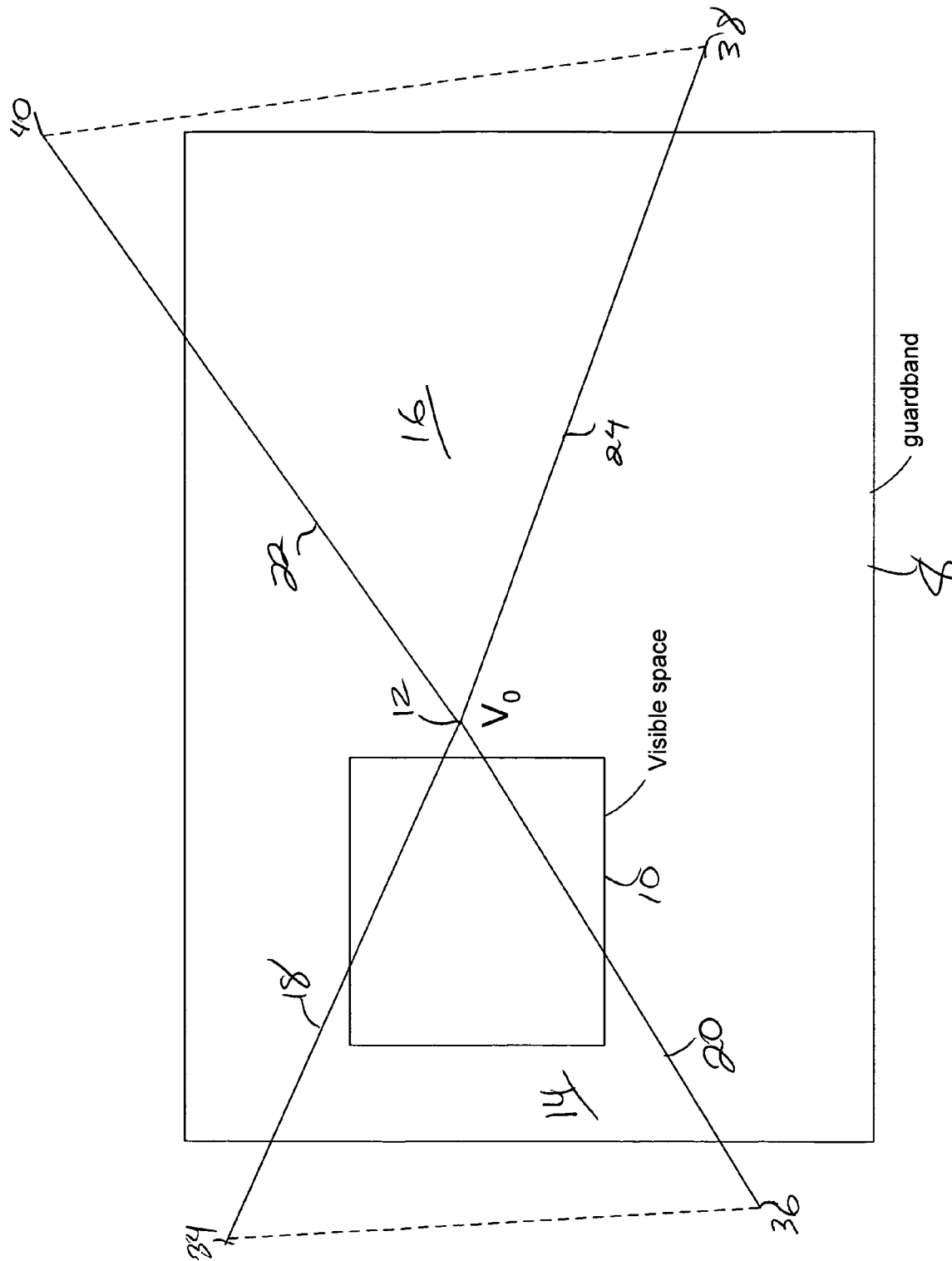
FIG. 4 shows the case where the common vertex is not visible.

In the second case, shown in FIG. 4, the common vertex $V_0$ 12 is not located in the visible space 10. Floating point numbers are assigned to the vertices 34, 36, 38, 40 and are used to setup the edge functions 18, 20, 22, 24 that bound the graphics primitives 14, 16. In particular, the x, y coordinates of the vertices are used to calculate the edge functions $ax+by+c=0$, which end up with floating point numbers for a, b and c. These coefficients are then scaled into the range represented by the bounding rectangle. Thus, after the scaling the edge functions are represented in fixed point format. The problem of a common vertex 12 being "split" does not occur here because, by definition, only edges are visible. Precision problems with floating point numbers may cause the actual edge to move somewhat, but this is of no consequence. The graphics primitives 14, 16 (at least the visible portions thereof) are then rendered using the edge functions $ax+by+c=0$, 18, 20, 22, 24 computed using the scaled fixed point numbers (derived from the floating point coefficients) for the a, b and c parameters.

Figure 5:
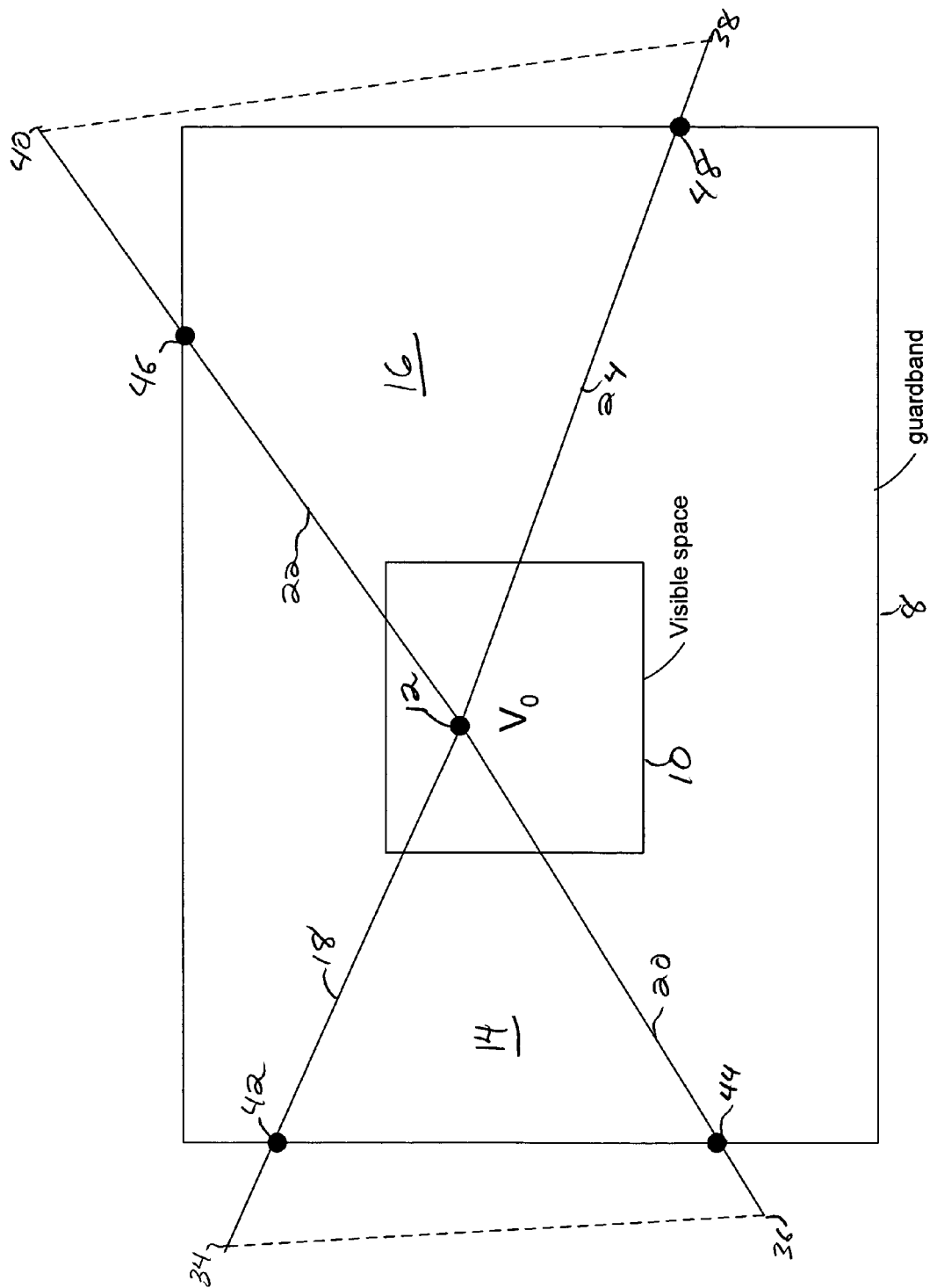
FIG. 5 shows the case where the common vertex is visible and the size of the graphics primitive is such as to be outside of the bounding rectangle.

In the third case shown in FIG. 5, the common vertex 12 is located in the visible area 10 but other vertices 34, 36, 38, 40 are outside of the bounding rectangle 8, and so cannot be represented by fixed point numbers. In this case, the points 42, 44, 46, 48 at which the edges 18, 20, 22, 24 of the graphics primitives 14, 16 intersect the bounding rectangle 8 are determined and these intersection points are mapped to a grid established in the bounding rectangle. The particular fixed point numbers that result from the mapping are then used to form the edge functions for the primitives 14, 16. The graphics primitives 14, 16 are then rendered by means of the edge functions, thereby guaranteeing that the common vertex does not split into multiple "common vertices."

Figure 6:
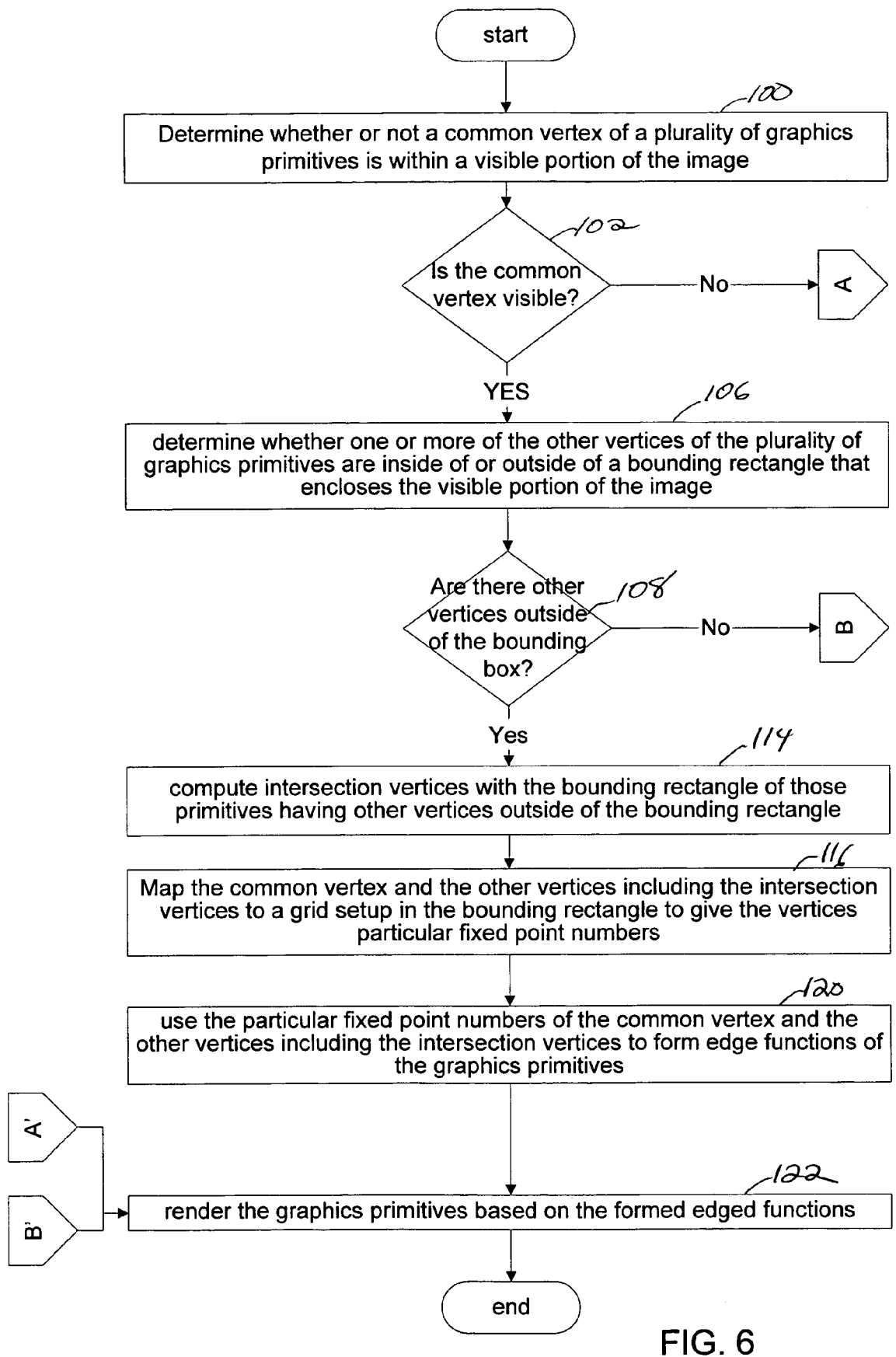
FIGS. 6 and 7 show a method in accordance with one embodiment of the present invention.
Figure 7:
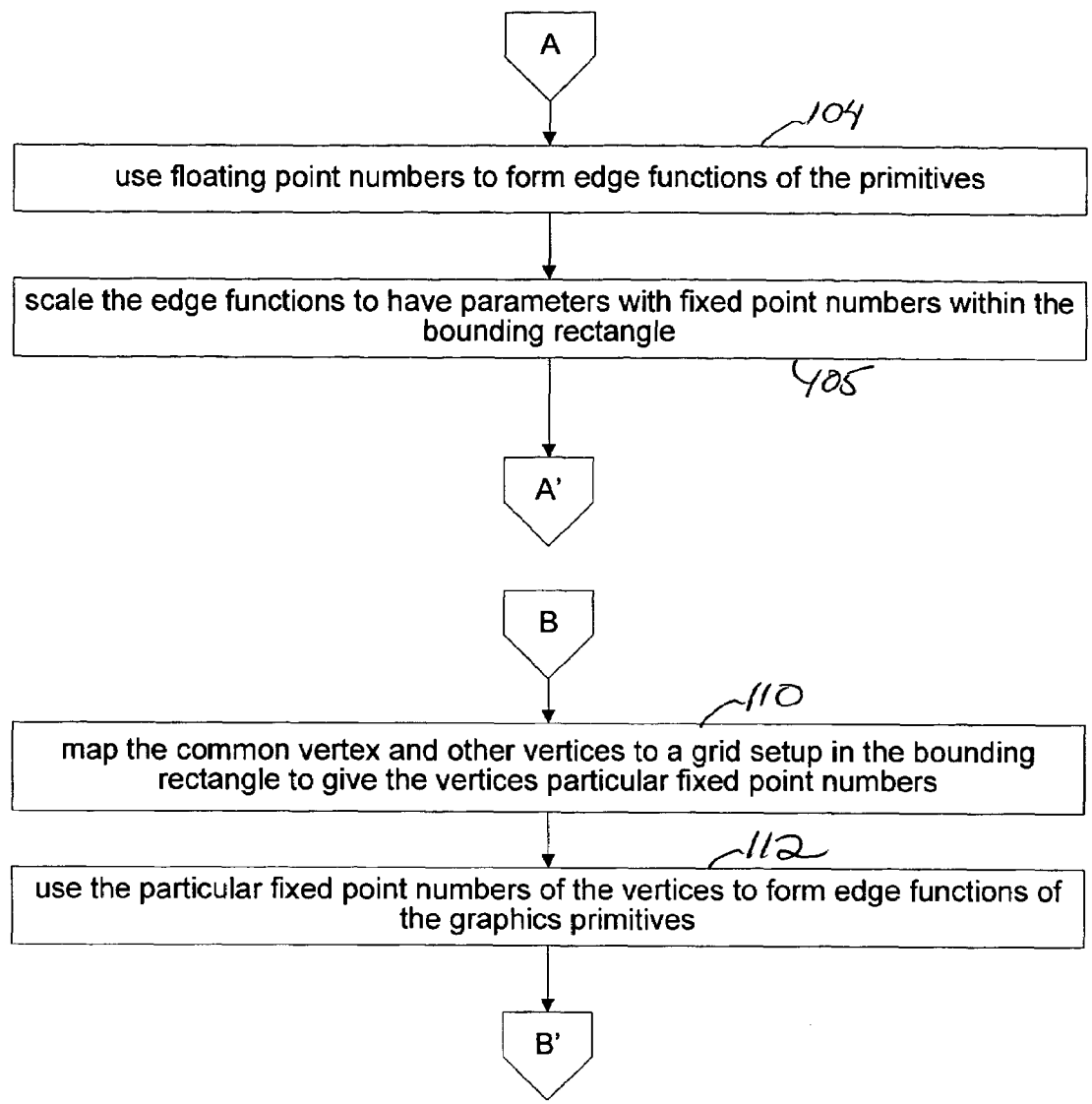

FIGS. 6 and 7 show a method in accordance with one embodiment of the present invention. In step 100, the method determines whether or not a common vertex of a plurality of graphics primitives is within a visible portion of an image to be displayed. If not, as determined in step 102, then (following off-page reference A) floating point numbers are used to form the edge functions of the primitives, in step 104, and the resulting edge functions are then scaled to have parameters with fixed point numbers within the bounding rectangle, in step 105.

If there is a visible common vertex, as determined in step 102, then the method determines, in step 106, whether one or more other vertices of the plurality of graphics primitives are inside of or outside of a bounding rectangle that encloses the visible portion of the image, where the bounding rectangle defines a range (between a minimum and maximum) of x and y values that are representable by a fixed point number system.

If there are no other vertices outside of the bounding rectangle, as determined in step 108, then (following B), the common vertex and the other vertices are mapped, in step 110, to a grid setup in the bounding rectangle, and the resulting particular fixed point numbers of the vertices are used, in step 112, to form the edge functions of the graphics primitives.

If one or more of the other vertices is outside the bounding rectangle, as determined in step 108, the intersection vertices with the bounding rectangle of those primitives with the vertices outside the bounding rectangle are computed, in step 114, and, in step 116, the other vertices including the intersection vertices and the common vertex are mapped to a grid setup in the bounding rectangle. The resulting particular fixed point numbers are used, in step 120, to form the edge functions of the graphics primitives.

Finally, in step 122, the graphics primitives are rendered based on the formed edge functions, regardless of how they are formed.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of rendering a visible portion of an image containing a plurality of graphics primitives having a common vertex, wherein each primitive has at least two other vertices and edge functions representing lines interconnecting the vertices of each primitive, comprising: forming edge functions for the lines interconnecting the vertices of each primitive using floating point numbers when the common vertex is not visible; forming edge functions for the lines interconnecting the vertices of each primitive using fixed point numbers when the common vertex is visible; and rendering the graphics primitives based on the formed edge functions.

2. A method of rendering as recited in claim 1, wherein forming edge functions when the common vertex is visible includes using fixed point numbers within or on a bounding rectangle for the parameters of the edge functions.

3. A method of rendering as recited in claim 2, wherein fixed point numbers on the bounding rectangle are used when a vertex of a primitive is outside of the bounding rectangle; and wherein the fixed point numbers on the bounding rectangle are determined by the intersection of the line of the primitive with the bounding rectangle.

4. A method of rendering as recited in claim 1, wherein a bounding rectangle defines the bounds of the fixed point numbers; and wherein the step of forming edge functions using floating point numbers includes scaling the formed edge function so that it can be represented with fixed point numbers.

5. A method of rendering a visible portion of an image containing a plurality of graphics primitives having a common vertex, wherein each primitive has at least two other vertices and edge functions representing lines interconnecting the vertices of each primitive, comprising: determining whether or not the common vertex is within the visible portion of the image; if the common vertex is visible, determining whether one or more of the other vertices of the plurality of graphics primitives are inside of or outside of a bounding rectangle that encloses the visible portion of the image, the bounding rectangle defining the bounds of a fixed point number system; if the common vertex is visible and one or more of the other vertices are determined to be outside of the bounding rectangle, computing intersection vertices with the bounding rectangle of those primitives having other vertices outside of the bounding rectangle, mapping the other vertices including the intersection vertices and the common vertex to a grid setup in the bounding rectangle, thereby representing the vertices with particular fixed point numbers, and using the particular fixed point numbers of the common vertex and the other vertices including the intersection vertices to form edge functions of the graphics primitives; if the common vertex is visible and all of the other vertices of the graphics primitives are determined to be within the bounding rectangle, mapping the common vertex and other vertices to a grid setup in the bounding rectangle, thereby representing the vertices with particular fixed point numbers, and using the particular fixed point numbers of the vertices to form edge functions of the graphics primitives; and if the common vertex is not visible, using floating point numbers to setup edge functions of the primitives, and scaling the edge functions to have parameters with fixed point numbers within the bounding rectangle; and rendering the graphics primitives based on the formed edge functions.

6. A method of rendering as recited in claim 5, wherein the graphics primitive is a triangle.

7. A method of rendering as recited in claim 5, wherein forming the edge functions includes computing parameters a, b and c of an edge equation $ax+by+c=0$.

* * * * *